Oct. 31, 1967 E. H. PETERSEN ETAL 3,349,633
AUTOMATIC BELT OR CHAIN TIGHTENING MECHANISM
FOR AN INFINITELY VARIABLE CONE PULLEY
TRANSMISSION
Filed May 3, 1965 3 Sheets-Sheet 1

INVENTORS
Erich Hermann Petersen
Herbert Karl Steuer
BY
Bailey, Stephens + Huettig
Attorneys Oct. 31, 1967 E. H. PETERSEN ETAL 3,349,633
AUTOMATIC BELT OR CHAIN TIGHTENING MECHANISM
FOR AN INFINITELY VARIABLE CONE PULLEY
TRANSMISSION
Filed May 3, 1965 3 Sheets-Sheet 3

INVENTORS
ERICH HERMANN PETERSEN,
HERBERT KARL STEUER,
BY Jennings Bailey, Jr.
ATTORNEY 3,349,633
AUTOMATIC BELT OR CHAIN TIGHTENING MECHANISM FOR AN INFINITELY VARIABLE CONE PULLEY TRANSMISSION
Erich H. Petersen and Herbert K. Steuer, Bad Homburg vor der Hohe, Germany, assignors to Reimers-Getriebe K.G., Ascona, Switzerland, a firm of Switzerland
Filed May 3, 1965, Ser. No. 452,677
Claims priority, application Germany, May 6, 1964, R 37,840
4 Claims. (Cl. 74—230.17)

The present invention relates to a mechanism for automaticaly tightening the endless driving element such as a belt or link chain of an infinitely variable cone pulley transmission, and more particularly it relates to improvements in a mechanism as described in the patent No. 3,190,136, by Herbert Steuer, one of the two inventors of the present invention.

This prior application describes a tightening mechanism, in which the endless driving element, for example, a belt or link chain, is tightened by means of a tightening spindle which is mounted between the transmission shafts and provided with right and left-hand threads, whereby the driving element running between two pairs of conical pulley disks may be tightened by reducing the distance between two tension blocks which are mounted on this spindle and carry control levers which are pivotally mounted thereon and are adapted to shift the conical disks of each pair in opposite axial directions and also to vary the distance between the conical disks of both pairs in the same direction when the distance between the two tension blocks is being changed. According to this prior invention, the two tension blocks are slidable on the tightening spindle in the longitudinal direction thereof and are acted upon in the axial direction of the tightening spindle and toward each other by springs which tend to tighten the driving element, while in the opposite direction, that is, away from each other, the tension blocks are braced on their outer sides by clamping nuts which are screwed upon the right and left-hand threads on the tightening spindle. The prior invention further consists in providing suitable spring means which act upon the clamping nuts and/or the tightening spindle so as to exert thereon a torque which tends to tighten the driving element.

This tightening mechanism is designed to prevent the desired adjustments of the tightening spindle from being affected by the various influences which tend to resist a rotary movement of this spindle. These influences especially include the frictional resistances which may vary very considerable not only in accordance with the varying conditions of operation and the differences in load of the transmission, but also because of the difference between the static friction and the friction which occurs after the adjusting movement has started. These influences further include the differences between the original and final tension of the tightening spring, the differences which are caused by changes in the surface condition of the threaded parts and joints, and, last but not least, the frictional resistance which is due to the fact that the tension blocks also carry the speed control levers and that, because of the weight and unavoidable tolerances in the dimensions of these levers, a certain tilting action is always exerted upon these tension blocks.

The tightening mechanism as described in this prior application therefore eliminates the frictional resistances on the screw threads of the tightening spindle by dividing the tightening operation into two movements, namely, the axial movement of the tension blocks which occurs practically without friction and the retightening movement of the clamping nuts or the tightening spindle which movement occurs likewise with very little friction when the transmission runs without a load. Due to the wedging action of the driving element between the two pairs of conical pulley disks which occurs when the transmission runs under a load and which is transmitted through the speed control levers to the tension blocks, these blocks are pressed against the clamping nuts on the tightening spindle. When the torque decreases and the wedging action of the driving element therefore also decreases, especially as soon as the transmission runs without a load and when therefore the only wedging action remaining is that which is caused by the weight of the driving element, and when the driving element has become worn and requires a readjustment of its tension, the tension blocks will be lifted off the clamping nuts by the force of the springs acting in the axial direction of the tightening spindle. The torque which is acting upon the clamping nuts will then turn the latter until they again engage upon the tension blocks.

It has now been found that, since the movable parts of this tightening mechanism are necessarily subject to a certain amount of wear, this wear in conjunction with the unavoidable manufacturing tolerances will result in certain changes in the small frictional resistance of the mechanism which affect the proper operation of the latter and cannot be controlled, except with great difficulty. It is therefore the object of the present invention to improve a tightening mechanism of the type as described in the mentioned prior application in a manner so that these small unavoidable resistances which interfere with a perfect operation of the mechanism will also be completely eliminated and the drawing element will be adjusted to the proper tension when such adjustment is actually required.

According to the present invention, this object may be attained by providing the parts of the tightening mechanism which are acted upon by a torque which tends to retighten the driving element with a locking device which controls the extent of the retightening movement of the clamping nuts and/or the tightening spindle and is adapted to be released by an unlocking or releasing element which is mounted on one of the tension blocks. This locking device may according to the invention be of a very simple and effective design and consist of a ratchet wheel which is adapted to be locked and released by engaging with and disengaging from a locking detent.

When the tightening mechanism is designed in this manner, the torque which tends to retighten the driving element will be taken up by the locking device until this device is released by the releasing element on one of the tension blocks. This permits the torque which is required for retightening the drive element to be made of such a strength that it will surely overcome the mentioned frictional influences which are caused by wear and manufacturing tolerances. Since the releasing element is mounted on one of the tension blocks and the locking device is mounted on the part which is to be turned for the retightening operation, and since a spring is provided which acts in the axial direction of the spindle and tends to separate the locking device from the releasing element, the releasing element will not disengage from the locking device until the two parts, i.e., the clamping nut and the tension block, have separated so far from each other that it is actually necessary to retighten the driving element. When the retightening operation has been carried out to the proper extent and the clamping nut together with the locking device are therefore moved so far toward the associated tension block that the two tension blocks are thereby adjusted to the new distance from each other which is in accordance with the degree of wear of the driving element, the locking device will again move toward and engage with the releasing element and thus take up the retightening torque. Since the retightening torque which according to the invention may now be made so strong so as surely to overcome all of the various resistances without, however, being able to cause the driving element to be tightened excessively, all of the difficulties which might otherwise occur during the retightening operation will now be completely eliminated. The extent of the tightening movement of the mechanism according to the invention may thus be held within limits which may be adjusted so as to be as small as desired and it will always remain constant without being affected by any external influences such as static friction or friction of motion, influences of thermal stresses, etc. The tightening mechanism according to the invention therefore fully attains the object that the driving element should be maintained at all times at the most suitable tension.

The features and advantages of the present invention will become more clearly apparent from the following detailed description thereof which is to be read with reference to the accompanying drawings, in which—

FIGURE 4 shows a ratchet wheel of the locking device according to FIGURE 1; while

Figure 6:
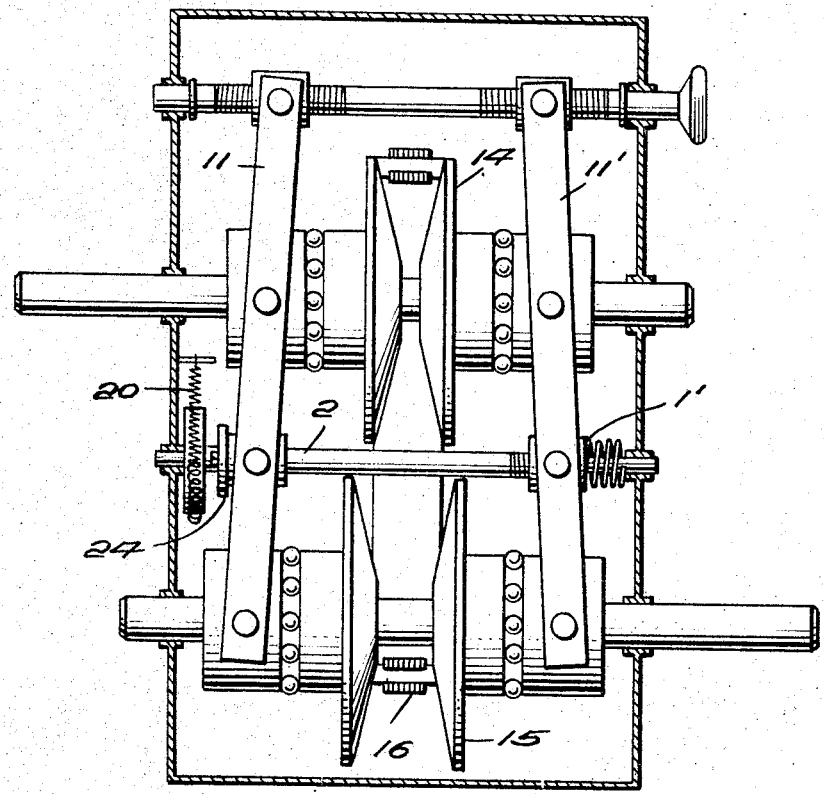
FIGURE 6 shows a transmission embodying the invention, partly in section.

In the drawings, FIGURE 6 illustrates diagrammatically the type of infinitely variable cone-pulley transmission to which the invention is applicable. It consists essentially of a pair of shafts, either of which may serve as the drive shaft or the driven shaft of the transmission and each of which carries a pair of conical pulley disks 14 or 15. The two pairs of conical disks are connected to each other by an endless driving element 16 such as a belt or chain. For varying the speed ratio of the transmission, the diameters of this driving element 16 between the two pairs of conical disks 14 and 15 may be adjusted relative to each other by decreasing the distance between the conical disks of one pair by a certain amount and by simultaneously increasing the distance between the disks of the other pair by a corresponding amount. This is accomplished by means of two pairs of control levers 11 and 11' which are pivotably mounted on tension blocks 1 and 1 and through tension rings and thrust ball bearings, act upon the conical disks to set and vary the relative distance of the conical disks of each pair from each other. The adjustment of a desired speed ratio of the transmission is carried out by means of setting spindle which, when turned, pivots the control levers 11 and 11' in opposite directions about their pivots on the tension blocks 1 and 1. Thus, when the setting spindle is turned in one direction, the pressure upon the conical disks of one pair, and through them upon the driving element 16, is increased so that the latter moves outwardly between these disks and increases to a certain extent in diameter, while at the same time the driving element 16 moves inwardly between the conical disks of the other pair and decreases to the same extent in diameter by pressing these disks apart for the distance allowed by the outward movement of the associated tension rings. Thus, when the setting spindle is turned in one direction, the speed ratio of the transmission is increased, while when it is turned in the other direction, the speed ratio is decreased.

Figure 1:
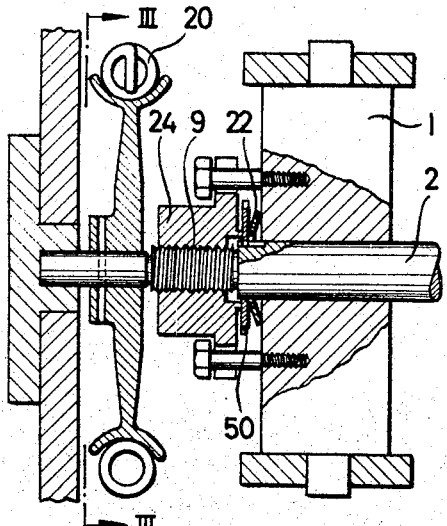
FIGURE 1 shows, mostly in a longitudinal section, a tightening mechanism according to the invention.
Figure 3:
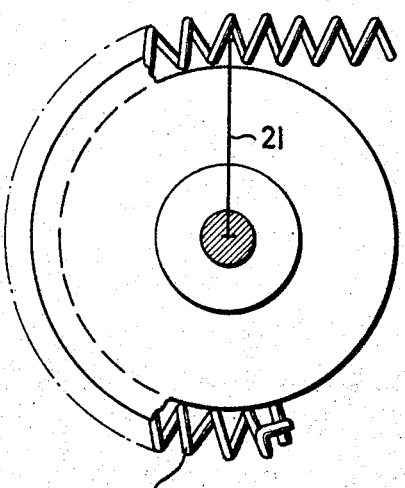
FIGURE 3 shows a cross section which is taken along the line III—III of FIGURE 1.
Figure 4:
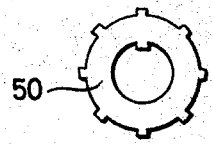
Figure 2:
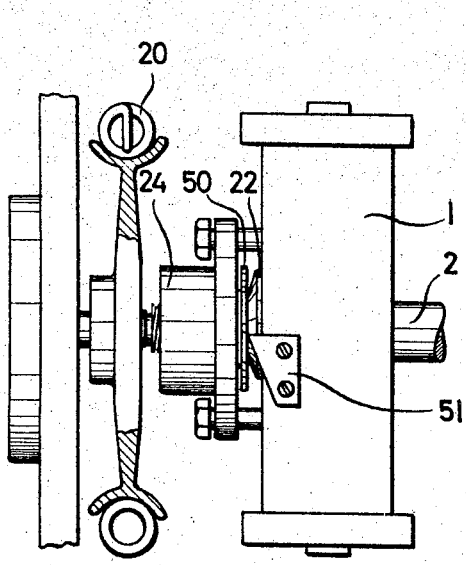
FIGURE 2 shows, partly in section, an elevation of the same mechanism.

As already mentioned, the tightening mechanism according to the present invention is generally of the same type as described in detail in the copending application as above referred to. As illustrated in FIGURES 1 to 3 this tightening mechanism consists of a tightening spindle 2 which passes through a bore in each of the two tension blocks 1, 1, the threaded part 9 of which carries the clamping nut 24 which braces the tension block 1 from its outer side. Between the tension block 1 and the clamping nut 24 the tightening spindle 2 carries a spring 22, for example, a plate spring, which acts in the axial direction of the spindle 2, and further a rachet wheel 50 which is connected to the spindle so as to be nonrotatable relative thereto and is operatively associated with a locking detent 51 which is mounted on the tension block 1. The tightening spindle 2 is acted upon by a coil spring 20 which by means of a lever 21 exerts a torque thereon which tends to retighten the driving element, not shown, for example, a belt or link chain.

When the tension of the driving element decreases, for example, due to wear, and when the transmission runs without load or only with a small load, spring 22 acts in the axial direction of the tightening spindle 2 and forces the tension block 1 away from the clamping nut 24 and the ratchet wheel 50 until the distance between the tension block and the clamping nut is so large that the ratchet wheel 50 will no longer engage with the locking detent 51 and the tightening spindle is therefore unlocked and able to turn under the action of spring 20 until the clamping nut 24 is again moved so far toward the tension block 1 that the locking detent 51 will again engage with one of the teeth of the ratchet wheel 50. The tension block 1 is thus moved by the clamping nut 24 in the direction toward the driving element so as to retighten the driving element to the required extent. At the opposite side of the tightening spindle 2, the other tension block may either be shifted in the direction toward the driving element in the same manner as described with reference to the tension block 1 or this other tension block may be provided with an inner screw thread which, when the tightening spindle 2 is turned, shifts this tension block for the same distance toward the driving element as the tension block 1 is shifted. The last-mentioned solution has the advantage that, when the tightening spindle 2 is turned and the driving element is tightened, the driving element will not be shifted from its normal vertical plane toward one side of the transmission.

Figure 5:
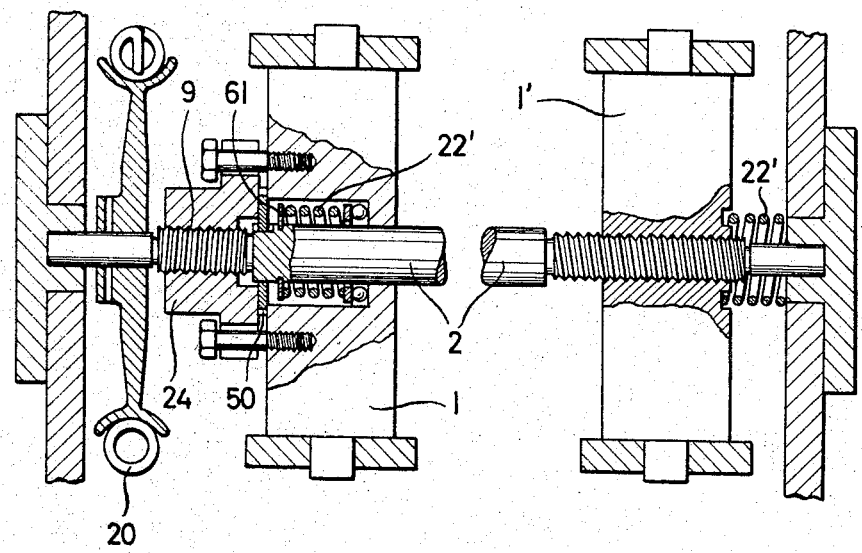
FIGURE 5 shows, mostly in a longitudinal section, a tightening mechanism according to a modification of the invention.

FIGURE 5 illustrates a modification of the tightening mechanism according to the invention which has the further advantage that even the points of friction between the clamping nut 24 and the rachet wheel 50 and between the ratchet wheel 50 and the spring 22' are eliminated. Furthermore, the screw thread of the clamping nut 24 is relieved of the pressure of the spring 22 which acts in the axial direction of the tightening spindle 2. Similarly, as illustrated in FIGURES 1 to 3, spring 22' acts at one side against the tension block 1, but in this case not directly but through a bearing 20 so as to avoid any possible friction. However, instead of acting at its other side upon the tightening spindle 12 through the ratchet wheel 50 and the clamping nut 24, it shifts the tightening spindle and thus also the ratchet wheel 50 directly by means of a washer 61 when the tension of the driving element decreases. If the opposite tension block 1' is provided with an internal screw thread in order to prevent the driving element from being shifted laterally from its normal vertical plane, this thread may be relieved of pressure and wear by the insertion of a spring 22' between the housing wall 13 and the tension block 1' which shifts the tension block 1' against the driving element with the same force as that at which the tension block 1 is shifted by the spring 22'. If the tightening mechanism is made of this design, there is no longer any possibility that it will be affected by any influences such as frictional resistances, and the driving element will always be retightened very exactly to the extent as determined by the spacing between the teeth on the ratchet wheel 50.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In an infinitely variable cone pulley transmission having a drive shaft and a driven shaft, pairs of conical pulley disks, the disks of one pair being mounted on each shaft so as to be axially slidable thereon, nonrotatable pressure members axially slidable on each shaft and adapted to press the disks of each pair toward each other, an endless driving element connecting both pairs of disks and adapted to run between them, means for automatically tightening the driving element comprising a tightening spindle mounted centrally between said shafts and having a screw thread near at least one end thereof, a pair of tension blocks disposed coaxially to each other, at least the first of said tension blocks being slidable axially on said spindle relative to the second tension block, control levers pivotably connected to said tension blocks and also to the pressure members associated with the disks of both pairs, means for equally pivoting said levers at the opposite sides of both pairs of disks in opposite directions to each other on said tension blocks, whereby, when said driving element runs between both pairs of disks, the disks of one pair are moved for a certain distance toward each other and the disks of the other pair are moved for the same distance away from each other so that the speed ratio of the transmission is changed, spring means acting upon at least said first tension block in the axial direction of said spindle and tending to move said first tension block toward said second tension block and thus also said lever on said first tension block toward the lever on the second tension block so as to tighten said driving element, a nutlike member screwed on said screw thread of said spindle and adapted to engage with the outer side of said first tension block, means for continuously producing a torque for turning said nutlike member and said spindle relative to each other so as to move said nutlike member for carrying out the tightening movement of said first tension block caused by said outer side of said first tension block, said nutlike member forming one part and said spindle forming a second part, and locking means adapted to prevent said torque from being transmitted to one of said parts so as to prevent said part from being moved in the direction in which it is adapted to effect a tightening of said driving element until a definite amount of need for said driving element to be tightened is exceeded at which time said locking means are released to effect said tightening of said driving element.

2. The transmission as defined in claim 1, wherein said locking means comprise a first locking member connected to one of said parts, and a second locking member mounted on one of said tension blocks, each of said two locking members being adapted to engage with and to be locked by the other locking member so as to prevent said torque from acting upon one of said two parts to tighten said driving element, one of said locking members being adapted to disengage from the other locking member when said definite amount of need for tightening said driving element is exceeded.

3. The transmission as defined in claim 2, wherein said first locking member consists of a ratchet wheel having teeth, and said second locking member consists of a locking detent adapted to engage with and disengage from said teeth of said ratchet wheel.

4. The transmission as defined in claim 3, wherein said spindle is acted upon by said torque and connected to said first locking member, said nutlike member being mounted on said threaded end of said spindle so as to be nonrotatable relative to one of said tension blocks.

References Cited
UNITED STATES PATENTS

| | | | |
|---|---|---|---|
| 2,913,188 | 11/1959 | Beresford et al. | 74—242.8 X |
| 2,917,986 | 12/1959 | Williamson | 74—242.8 X |
| 3,097,540 | 7/1963 | Berens | 74—230.17 |
| 3,136,169 | 6/1964 | Karger et al. | 74—230.17 |
| 3,138,033 | 6/1964 | Glasson et al. | 74—230.17 |
| 3,190,136 | 6/1965 | Steuer | 74—230.17 |

FRED C. MATTERN, Jr., *Primary Examiner.*

DAVID J. WILLIAMOWSKY, *Examiner.*

J. A. WONG, *Assistant Examiner.*